(12) United States Patent  
Carteri et al.

(10) Patent No.: US 11,151,308 B2  
(45) Date of Patent: Oct. 19, 2021

(54) ELECTRONIC DOCUMENT PROCESSING SYSTEM

(71) Applicant: International Business Machines Corporation, Armonk, NY (US)

(72) Inventors: Francesco Maria Carteri, Rome (IT); Luigi Pichetti, Rome (IT); Giuseppe Ciano, Rome (IT)

(73) Assignee: International Business Machines Corporation, Armonk, NY (US)

( * ) Notice: Subject to any disclaimer, the term of this patent is extended or adjusted under 35 U.S.C. 154(b) by 77 days.

(21) Appl. No.: 16/193,134

(22) Filed: Nov. 16, 2018

(65) Prior Publication Data

US 2020/0159819 A1    May 21, 2020

(51) Int. Cl.
| | |
|---|---|
| G06F 17/20 | (2006.01) |
| G06F 40/169 | (2020.01) |
| G06F 16/93 | (2019.01) |
| G06F 16/2455 | (2019.01) |

(52) U.S. Cl.
CPC ............ *G06F 40/169* (2020.01); *G06F 16/93* (2019.01); *G06F 16/2455* (2019.01)

(58) Field of Classification Search
CPC ....... G06F 40/169; G06F 16/38; G06F 16/383
See application file for complete search history.

(56) References Cited

U.S. PATENT DOCUMENTS

| | | |
|---|---|---|
| 6,356,922 B1 | 3/2002 | Schilit et al. |
| 8,539,346 B2 | 9/2013 | Albornoz et al. |
| 9,195,706 B1 | 11/2015 | Finkelstein et al. |
| 2005/0027664 A1 | 2/2005 | Johnson et al. |
| 2011/0161445 A1* | 6/2011 | Nelke .................... H04L 51/04 709/206 |
| 2011/0202825 A1 | 8/2011 | Volsky |
| 2011/0270856 A1* | 11/2011 | Dettinger ............ G06F 16/9558 707/758 |
| 2014/0343921 A1* | 11/2014 | Fink ........................ G06F 40/20 704/9 |
| 2016/0026614 A1 | 1/2016 | Bireta et al. |

(Continued)

OTHER PUBLICATIONS

Cabrera et al., "How to reference annotations in a cognitive search skillset," https://docs.microsoft.com/en-us/azure/search/cognitive-search-concept-annotations-syntax, May 1, 2018, 3 pgs.

(Continued)

*Primary Examiner* — Keith D Bloomquist  
(74) *Attorney, Agent, or Firm* — Peter K. Suchecki

(57) ABSTRACT

Provided is a computer-implemented method, system, and computer program product for processing an electronic document. The method may include retrieving an electronic document during a computing session maintained for a user of a computer system. The method may also include determining context information related to the computing session. The method may also include selecting at least one annotator from a set of annotators based on the context information, the at least one annotator comprising data describing a set of rules for annotating content of the electronic document. The method may also include associate the selected annotator with the electronic document, wherein the associating is specific to the user.

20 Claims, 10 Drawing Sheets

(56) References Cited

U.S. PATENT DOCUMENTS

2016/0147399 A1* 5/2016 Berajawala ........... G06F 40/169
                                                    715/753
2016/0196336 A1   7/2016 Allen et al.
2017/0308587 A1* 10/2017 Nagel ................. G06F 16/3322
2017/0329757 A1  11/2017 Knudson et al.
2019/0079922 A1*  3/2019 Moskowitz ........... G06F 40/103

OTHER PUBLICATIONS

IBM, "Annotating documents," https://console.bluemix.net/docs/services/knowledge-studio/annotate-documents.html#annotate-documents, last updated Aug. 14, 2017, 9 pgs.

Kalboussi, et al., "How to Organize the Annotation Systems in Human-Computer Environment Study: Study, Classification and Observations," https://hal.inria.fr/hal-01599871/document, HAL Id: hal-01599871, submitted Oct. 2, 2017, 19 pgs.

Unknown, "Dynamic Linking-Excel Word and PowerPoint 2010," https://www.youtube.com/watch?v=Qyffi3MiZKo, published Jan. 27, 2013, printed Oct. 2, 2018, 2 pgs.

Unknown, "How to link PowerPoint to Excel for dynamic data updates?", https://www.youtube.com/watch?v=6JfhAalwa4w, published Nov. 18, 2014, printed Oct. 2, 2018, 2 pgs.

Mell et al., "The NIST Definition of Cloud Computing," Recommendations of the National Institute of Standards and Technology, U.S. Department of Commerce, Special Publication 800-145, Sep., 2011, 7 pgs.

\* cited by examiner

| Annotator | Classification | Usage Scope | User Context | User Profile | Level of potential Interest |
|---|---|---|---|---|---|
| Annotator symptom headache | Medicine | Cure of headache | At work: Fixing defects | Stressed | 1.0 |
| Annotator symptom headache | Medicine | Cure of headache | At work: always on the same project | Comfort zone | 0.1 |
| Annotator Cloud network | Software | Setup cloud network | At work: Preparing a cloud POC | Engaged | 1.0 |
| Annotator Skiing technique | Sport | Leisure | Planning vacation | Balanced | 0.5 |

FIG. 3

[Low back pain] is a considerable health problem in all developed countries and is most commonly treated in primary healthcare settings. It is usually [defined as] [pain, muscle tension] or stiffness [localised below the costal margin] and [above the inferior gluteal folds,] [with or without] [leg pain] [(sciatica)]. The most important symptoms of non-specific low back pain are pain and disability. The diagnostic and therapeutic management of patients with low back pain has long been characterised by considerable variation within and between countries among general practitioners, medical specialists, and other healthcare professionals.[1,2]

FIG. 5A

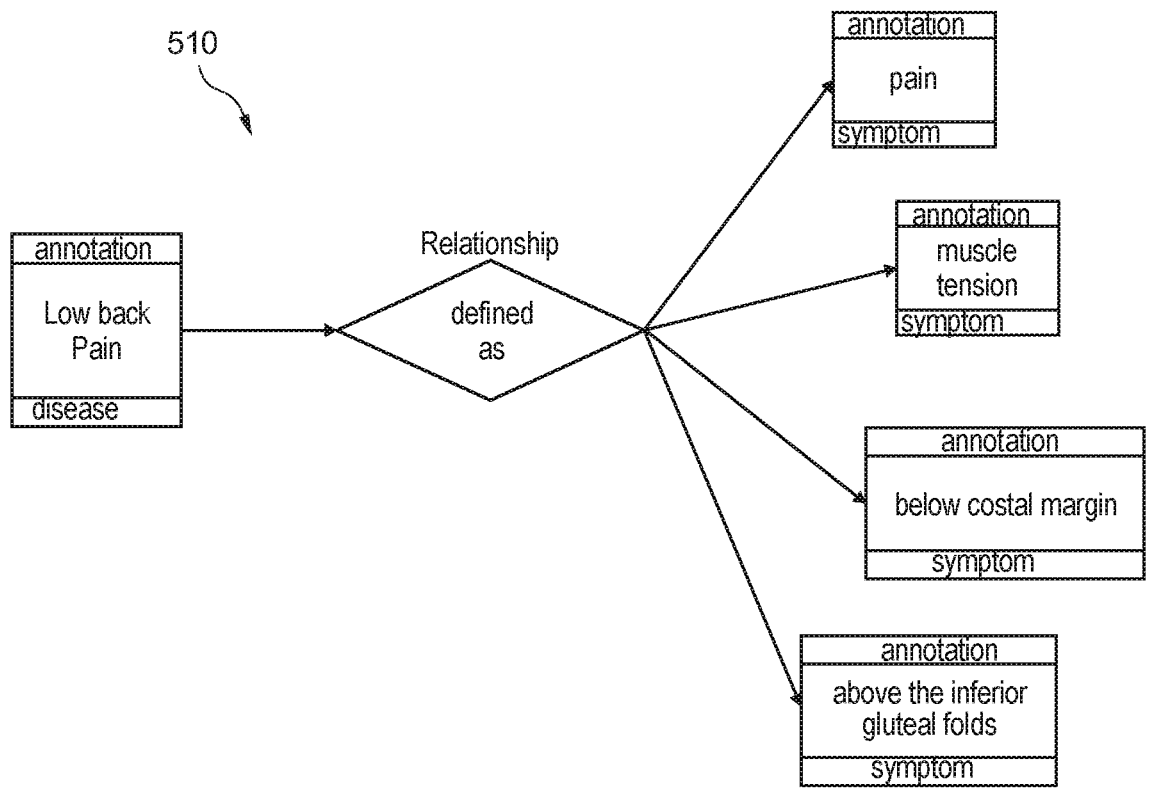

```
<rdf:li rdf: parseType="Rule">
  <rdf:Seq>
    <rdf:li rdf: parseType= "Annotation">
      <pdfaProperty: name>Disease</ pdfaProperty: name>
      <pdfaProperty: valueType>Text</ pdfaProperty: valueType>
      <pdfaProperty: occurrence>one or more</ pdfaProperty: occurrence>
      <pdfaProperty: tokens>Low back pain</ pdfaProperty: tokens>
    </rdf:li>

<rdf:li rdf:parseType= "Relationship">
      <pdfaProperty: name>Defined as</ pdfaProperty: name>
      <pdfaProperty: valueType>Text</ pdfaProperty: valueType>
      <pdfaProperty: occurrence>one or more</ pdfaProperty: occurrence>
      <pdfaProperty: tokens>defined as</ pdfaProperty: tokens>
    </rdf:li>

<rdf:Seq>
      <rdf:li rdf:parseType= "Annonation">
        <pdfaProperty: name>Sympthom</ pdfaProperty: name>
        <pdfaProperty: valueType>Text</ pdfaProperty: valueType>
        <pdfaProperty: occurrence>one or more</ pdfaProperty: occurrence>
        <pdfaProperty: tokens>pain</ pdfaProperty: tokens>
      </rdf:li>
      <rdf:li rdf:parseType= "Annotation">
        <pdfaProperty: name>Sympthom</ pdfaProperty: name>
        <pdfaProperty: valueType>Text</ pdfaProperty: valueType>
        <pdfaProperty: occurrence>zero or more</ pdfaProperty: occurrence>
        <pdfaProperty: tokens>muscle tension</ pdfaProperty: tokens>
      </rdf:li>
      <rdf:li rdf:parseType= "Annonation">
        <pdfaProperty: name>Sympthom</ pdfaProperty: name>
        <pdfaProperty: valueType>Text</ pdfaProperty: valueType>
        <pdfaProperty: occurrence>zero or more</ pdfaProperty: occurrence>
        <pdfaProperty: tokens> leg pain</ pdfaProperty: tokens>
      </rdf:li>
      <rdf:li rdf:parseType= "Annonation">
        <pdfaProperty: name>Sympthom</ pdfaProperty: name>
        <pdfaProperty: additional>where</ pdfaProperty: additional>
        <pdfaProperty: valueType>Text</ pdfaProperty: valueType>
        <pdfaProperty: occurrence>zero or more</ pdfaProperty: occurrence>
        <pdfaProperty: tokens>above the inferior gluteal
          folds</pdfaProperty: tokens>
      </rdf:li>
      <rdf:li rdf:parseType= "Annonation">
        <pdfaProperty: name>Sympthom</ pdfaProperty: name>
        <pdfaProperty: additional>where</ pdfaProperty: additional>
        <pdfaProperty: valueType>Text</ pdfaProperty: valueType>
        <pdfaProperty: occurrence>zero or more</ pdfaProperty: occurrence>
        <pdfaProperty: tokens>below costal margin</ pdfaProperty: tokens>
      </rdf:li>
    </rdf: Seq>
  </rdf: Seq>
```

FIG. 5C

ELECTRONIC DOCUMENT PROCESSING SYSTEM

BACKGROUND

The present invention relates to the field of digital computer systems, and more specifically, to a method of processing an electronic document.

An electronic document is an electronic media content that is intended to be used in either an electronic form or as printed output. Due to technological developments and increased information consumption, the use of electronic documents has gained prominence. However, as the need for efficient access to information technology increases, the means for creating and accessing electronic documents need improvements.

SUMMARY

The present invention provides a computer-implemented method, system, and computer program product for processing an electronic document. The method may include retrieving an electronic document during a computing session maintained for a user of a computer system. The method may also include determining context information related to the computing session. The method may also include selecting at least one annotator from a set of annotators based on the context information, the at least one annotator comprising data describing a set of rules for annotating content of the electronic document. The method may also include associate the selected annotator with the electronic document, wherein the associating is specific to the user.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

FIG. 3 depicts tables of context information and corresponding annotators, in accordance with embodiments of the present disclosure.

FIG. 5A depicts a text portion of an electronic document, wherein different texts are annotated, in accordance with embodiments of the present disclosure.

FIG. 5B depicts an example annotator-rule defining a relationship between a disease and one or more symptoms, in accordance with embodiments of the present disclosure.

FIG. 5C depicts an example snippet of XML of the PDF/A introducing the annotations and the rule, in accordance with embodiments of the present disclosure.

Figure 1:
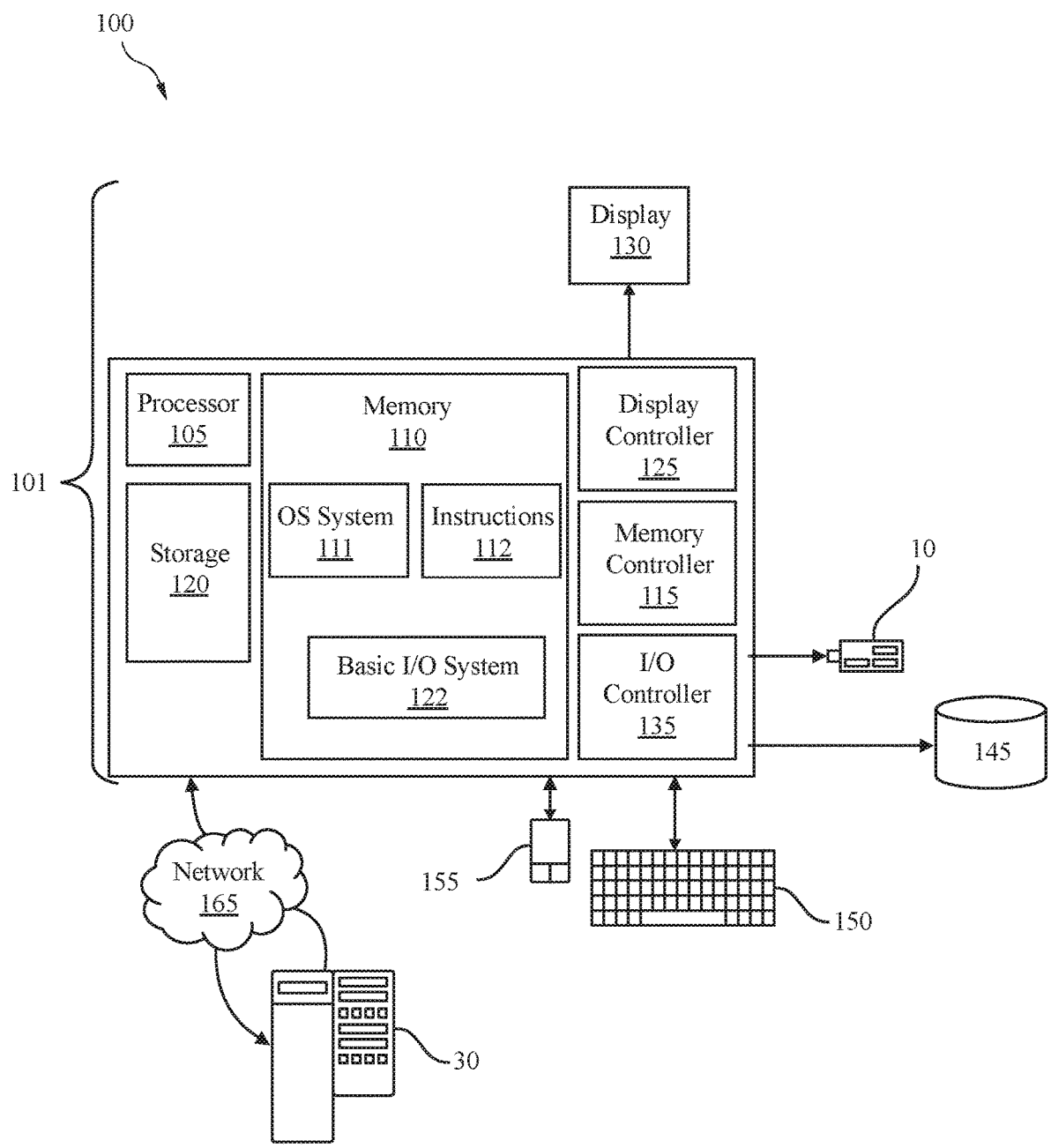
FIG. 1 represents a computerized system, suited for implementing one or more method steps, in accordance with embodiments of the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

The descriptions of the various embodiments of the present disclosure will be presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present method may improve the capability to retrieve, for example through a search or scan, the documents that best match the user profile and context the user is currently running. The document search can be performed by exploiting the annotators that can be present in the document. The present method may enable extending, in a dynamic way, the existing documents by adding proper annotators and reuse them for future searches performed by similar users in a similar context. The present method may add annotators that are tailored to the user profile and context that may be useful for other users. This may improve documents usage as a document that is created by a user may be shared with other users.

The computing session is a period during which a user is using the computer system. For example, a computing session may be during that period the user is logged in or connected to the computer system. Logging out or shutting down the computer system will end the computing session. During that period, information may be interchanged between the computer system and other devices (e.g., via a network connection). Context information related to the computing session comprises information indicative of the user and/or computer system and/or data processing performed and/or type of data processed and/or content of data processed during the computing session.

The electronic document is used to describe any electronic document that may contain different forms of information including text and graphics, etc. The electronic document may be configured to contain additional information (e.g., in form of metadata) such as information about the owner of the document in addition to the content of the electronic document. An electronic document may, for example, be a PDF document, a Word document, an image document, an e-mail, etc. The electronic document may be formatted in a markup language such as, e.g., a HyperText Markup Language (HTML), an Extensible Markup Language (XML), an eXtensible Hyper Text Markup Language (XHTML), a Standard Generalized Markup Language (SGML), a Wireless Markup Language (WML), etc.

An annotator may, for example, be a program or file that enables to analyze an electronic document and infers information from the document. The annotator may, for example, be a component that contains an analysis logic. The annotator is configured to (or may enable) process (e.g., parse) an electronic document for performing a predefined analysis and to produce the analysis results as part of the electronic document. The analysis results may, for example, be produced in the form of typed data structures, wherein a data structure indicates a data type and one or more pairs of attributes and corresponding values. An annotation is an example of the data structure that is attached to a region of the electronic document being analyzed (a span of text in a document, for example). For example, an annotator may produce an annotation over the span of text "Low back pain", where the type of the annotation is Disease and the attribute Name has the value back pain. For example, the annotator is configured to identify a sequence of tokens and to annotate the identified tokens. The tokens may, for example, be words, numbers, punctuation, etc. The annotator may be advantageous as it may enable that the analysis logic (e.g., created by one user) is propagated to all the users that receive the electronic document.

Another advantage of the present method may be that once a document such as a PDF document has annotators in its shell, relationships can be established between the PDF document and other PDF documents for the same topic or with other PDF documents that have in common any "relationship". Once the PDF document is received, it contains itself the annotators and this may be advantageous for scientists. For example, the shell of the PDF document can bring precious information that can be leveraged not only by a scientist but by the normal reader as well.

According to some embodiments, associating the selected annotator comprises physically including the annotator into the electronic document. The selected annotator may, for example, be part of the additional information of the electronic document.

According to some embodiments, the method comprises storing the association between a certain electronic document and the annotation (or annotator) related to the respective context information in a document repository and wherein selecting the annotator comprises querying the document repository. For example, the determined context information of the user may be compared with stored context information and if there is a match the one or more annotators associated with the matched context information may be selected.

According to some embodiments, the method further comprises processing the electronic document using the selected annotator (referred to as processing step); and providing at least part of the processed electronic document (referred to as providing step). According to some embodiments, the provision of the processed electronic document comprises providing annotated content of the processed electronic document. Providing the annotated content only may save processing resources such as the network bandwidth and storage resources. This may further enable specialized search and analysis of the electronic documents based on user needs and user contexts.

According to some embodiments, the method further comprises retrieving a second electronic document during the computing session and selecting a subset of annotators from the set of annotators based on the context information, the subset of annotators comprising data describing a second set of rules for annotating content of the second electronic document. If a portion of the selected one or more annotators for the second electronic document is different from the one or more annotators selected for the first electronic document, the processing and the providing steps may be performed for the second electronic document. Otherwise, at least part of the processed first electronic document may be provided as the response to the retrieving of the second electronic document. The annotations of the first electronic document may be valid or representative of the second electronic document. This embodiment may save resources that would otherwise be required for storing duplicated or similar annotations of each processed document.

According to some embodiments, the processing and the providing steps are performed for the second electronic document if none of the selected one or more annotators of the second electronic document is one of the at least one selected annotator of the first electronic document. This may enable an accurate set of annotated content.

According to some embodiments, the method further comprises receiving a request of the first electronic document from another user, determining the context information for the other user and if the context information of the other user comprises at least part of the determined context information providing at least part of the processed first electronic document as response to the request. This may provide accurate search results and may save processing resources that would otherwise be required by unnecessary multiple searches to obtain the right result.

According to some embodiments, the method further comprises, if the context information of the other user does not comprise at least part of the determined context information, determining context information related to the computing session of the another user; selecting a second subset of annotators from the set of annotators based on the context information of the another user, the second subset of annotators comprising data describing a third set of rules for annotating content of the electronic document; associating the selected second subset of annotators with the electronic document, wherein said associating is specific to the another user; processing the electronic document using the selected second subset of annotators; and providing at least part of the electronic document processed using the second subset of annotators.

According to some embodiments, the context information comprises at least one of: current usage scope, classification of the retrieved electronic document, or user profile information.

According to some embodiments, the method further comprises storing the selected annotator in association with an identifier of the electronic document in a predefined database.

According to some embodiments, the method may be repeated for other electronic documents.

According to some embodiments, the method further comprises, in response to receiving the request of an electronic document, searching the database for identifying similar annotators of the annotator of the requested electronic document and returning the identifiers of the documents associated with the similar annotators.

These embodiments may enable an optimized search infrastructure and method. For example, when electronic documents and the annotators are available in a central repository, a cloud service engine can analyze all the metadata and documents, checks if the annotators (or part of them) are in common with a specific document in order to improve search queries responses.

It is to be understood that the aforementioned advantages are example advantages and should not be construed as limiting. Embodiments of the present disclosure can contain all, some, or none of the aforementioned advantages while remaining within the spirit and scope of the present disclosure.

With reference now to FIG. 1, shown is a general computerized system 100, suitable for implementing one or more method steps, in accordance with embodiments of the present disclosure. It will be appreciated that the methods described herein are at least partly non-interactive, and automated by way of computerized systems, such as servers or embedded systems. In exemplary embodiments though, the methods described herein can be implemented in a (partly) interactive system. These methods can further be implemented in software (e.g., instructions 112, basic input output system 122), other firmware (not shown), hardware (e.g., processor 105), or a combination thereof. In exemplary embodiments, the methods described herein are implemented in software, as an executable program, and is executed by a special or general-purpose digital computer, such as a personal computer, workstation, minicomputer, or mainframe computer. The most general system 100 therefore includes a general-purpose computer 101.

In exemplary embodiments, in terms of hardware architecture, as shown in FIG. 1, the computer 101 includes a processor 105, memory (e.g., main memory) 110 coupled to a memory controller 115, and one or more input and/or output (I/O) devices (or peripherals) 10, 145 that are communicatively coupled via a local input/output controller 135. The input/output controller 135 can be, but is not limited to, one or more buses or other wired or wireless connections, as is known in the art. The input/output controller 135 may have additional elements, which are omitted for simplicity, such as controllers, buffers (caches), drivers, repeaters, and receivers, to enable communications. Further, the local interface may include address, control, and/or data connections to enable appropriate communications among the aforementioned components. As described herein the I/O devices 10, 145 may generally include any generalized cryptographic card or smart card known in the art.

The processor 105 is a hardware device for executing software, particularly that stored in memory 110. The processor 105 can be any custom made or commercially available processor, a central processing unit (CPU), an auxiliary processor among several processors associated with the computer 101, a semiconductor based microprocessor (in the form of a microchip or chip set), a macroprocessor, or generally any device for executing software instructions.

The memory 110 can include any one or combination of volatile memory elements (e.g., random access memory (RAM, such as DRAM, SRAM, SDRAM, etc.)) and non-volatile memory elements (e.g., ROM, erasable programmable read only memory (EPROM), electronically erasable programmable read only memory (EEPROM), programmable read only memory (PROM). Note that the memory 110 can have a distributed architecture, where various components are situated remote from one another, but can be accessed by the processor 105.

The software in memory 110 may include one or more separate programs, each of which comprises an ordered listing of executable instructions for implementing logical functions, notably functions involved in embodiments of this disclosure. In the example of FIG. 1, software in the memory 110 includes instructions 112 e.g. instructions to manage databases such as a database management system.

The software in memory 110 shall also typically include a suitable operating system (OS) 111. The OS 111 essentially controls the execution of other computer programs, such as possibly software 112 for implementing methods as described herein.

The methods described herein may be in the form of a source program 112, executable program 112 (object code), script, or any other entity comprising a set of instructions 112 to be performed. When a source program, then the program needs to be translated via a compiler, assembler, interpreter, or the like, which may or may not be included within the memory 110, so as to operate properly in connection with the OS 111. Furthermore, the methods can be written as an object oriented programming language, which has classes of data and methods, or a procedure programming language, which has routines, subroutines, and/or functions.

In exemplary embodiments, a conventional keyboard 150 and mouse 155 can be coupled to the input/output controller 135. Other output devices such as the I/O devices 145 may include input devices, for example but not limited to a printer, a scanner, microphone, and the like. Finally, the I/O devices 10, 145 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The I/O devices 10, 145 can be any generalized cryptographic card or smart card known in the art. The system 100 can further include a display controller 125 coupled to a display 130.

In exemplary embodiments, the system 100 can further include a network interface for coupling to a network 165. The network 165 can be an IP-based network for communication between the computer 101 and any external server, client and the like via a broadband connection. The network 165 transmits and receives data between the computer 101 and external systems 30, which can be involved to perform part or all of the steps of the methods discussed herein. In exemplary embodiments, network 165 can be a managed IP network administered by a service provider. The network 165 may be implemented in a wireless fashion, e.g., using wireless protocols and technologies, such as WiFi, WiMax, etc. The network 165 can also be a packet-switched network such as a local area network, wide area network, metropolitan area network, Internet network, or other similar type of network environment. The network 165 may be a fixed wireless network, a wireless local area network (LAN), a wireless wide area network (WAN) a personal area network (PAN), a virtual private network (VPN), intranet or other suitable network system and includes equipment for receiving and transmitting signals.

The network 165 may be any type of computing network, such as a cloud computing network. Consistent with various embodiments, a cloud computing environment may include a network-based distributed data processing system that provides one or more cloud computing services. Further, a cloud computing environment may include many computers (e.g., hundreds or thousands of computers or more) disposed within one or more data centers and configured to share resources over the network 165. The network 165 may be substantially similar to, or the same as, network 50 described in FIG. 8 and FIG. 9.

If the computer 101 is a PC, workstation, intelligent device or the like, the software in the memory 110 may further include a basic input output system (BIOS) 122. The BIOS is a set of essential software routines that initialize and test hardware at startup, start the OS 111, and support the transfer of data among the hardware devices. The BIOS is stored in ROM so that the BIOS can be executed when the computer 101 is activated.

When the computer 101 is in operation, the processor 105 is configured to execute software 112 stored within the memory 110, to communicate data to and from the memory 110, and to generally control operations of the computer 101 pursuant to the software. The methods described herein and the OS 111, in whole or in part, but typically the latter, are read by the processor 105, possibly buffered within the processor 105, and then executed.

When the systems and methods described herein are implemented in software 112, as is shown in FIG. 1, the methods can be stored on any computer readable medium, such as storage 120, for use by or in connection with any computer related system or method. The storage 120 may comprise a disk storage such as HDD storage.

Figure 2:
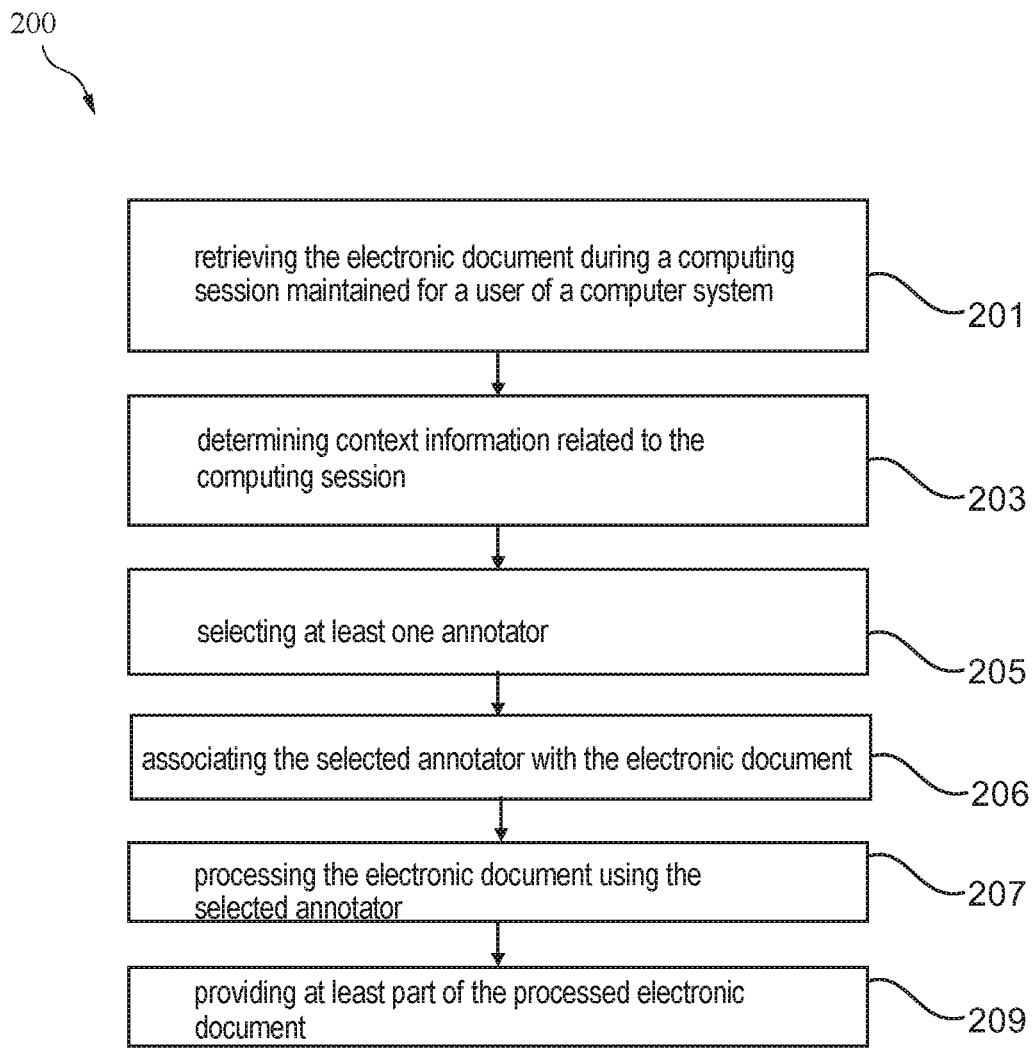
FIG. 2 is a flowchart of a method of processing an electronic document, in accordance with embodiments of the present disclosure.

Referring now to FIG. 2, shown is a flowchart of a method 200 for processing an electronic document, in accordance with embodiments of the present disclosure. In some embodiments, the electronic document may, for example, be a PDF document. The method 200 may be performed by processing logic that comprises hardware (e.g., circuitry, dedicated logic, programmable logic, microcode, etc.), software (e.g., instructions run on a processor to perform hardware simulation), firmware, or a combination thereof. In some embodiments, the method 200 is a computer-implemented process. The process 200 may be performed by processor 105 of general computer 101 exemplified in FIG. 1.

In step 201, the electronic document may be retrieved during a computing session maintained for a user of a computer system. For example, the electronic document may be retrieved from a server (e.g., a web server connected to the computer system via a network, such as the Internet, a local area network, a wide area network and/or a wireless network).

In step 203, context information related to the computing session may be determined. The context information may, for example, comprise current usage scope, classification of the retrieved electronic document, and/or user profile information. For example, the context information may comprise the list of documents downloaded by the user and optionally by peers of the user. And for each document of the list, the usage scope for the reader of the document may be determined. The usage scope may, for example, indicate fields such as business, vacation, leisure, cure some disease, etc. The fields may, for example, be determined based on the programs and/or data used by the user of the computer system. The context information may, for example, further comprise the classification of the retrieved electronic document. The classification may indicate a document's field such as medicine, literature, sports, etc.

Referring now to FIG. 3, shown are tables 300 of context information and corresponding annotators, in accordance with embodiments of the present disclosure. The context information, such as the context or profile of the user, may, for example, be obtained using a natural language processing (NLP) algorithm for analyzing the text of currents chats, socials, and any documents, applications opened by the user during the computing session. The context information such as the user context and the user profile may be provided as attribute values in a table as shown in FIG. 3. User table 301 may, for example, comprise attributes 303A-B indicative of the context information. Each row of the table 301 is associated with a given user and a given computing session. The first row of the table 301 indicates, for example, that the user context indicates that the user is at work he is fixing defects (e.g., software bugs). The user profile for the first row indicates that the user is stressed.

Returning to FIG. 2, in step 205, one or more annotators may be selected from a set of annotators based on the context information. The annotator comprises data describing a set of rules for automated annotating content of the electronic document. For example, predefined annotators may be provided, e.g., in a table as shown in FIG. 3. The table 305 of FIG. 3 comprises attributes 306A-C indicative of the annotators. Each row of the table 305 is associated with an annotator. The attributes 306B-C are indicative of the classification of the annotator and its usage scope respectively. For example, the first row of table 305 indicates that the annotator named "symptom headache" is classified as a medicine class and its usage scope is the cure of headache. The annotators may, for example, be created by using the Unstructured Information Management Architecture (UIMA) framework and the product IBM Watson Explorer Content Analytics Studio. For example, an IBM Watson Content Analytics may be used to annotate the plain text defining the class of annotators.

Table 305 may, for example, be used to select the annotator that would correspond to or match the determined context information. For example, the determined context information may comprise values of the attributes 303A-B. Said attribute values may be compared with the values of at least one of the attributes 306B-C. The table 301 may further comprise the level of potential interest attribute 310 of the user to a given annotator. For example, the level of potential interest may be user predefined. In another example, the result of this comparison may be used to evaluate the level of potential interest (e.g., which may be the level of match of the compared attribute values) attribute 310 of the user to annotations provided by an annotator as shown in FIG. 3. For example, the context information comprising a user context indicating that the user is preparing a cloud POC, would match the attributes values of the third row of the table 305. This may result in selecting the annotator "cloud network" of the table 305 for the user of the third row of the table 301. For example, the selection may be performed if the value of the level of potential interest attribute 310 is higher than a predefined threshold (e.g., 0.5).

In step 206, the selected one or more annotator may be associated with the electronic document, wherein said associating is specific to the user. Associating the selected annotator comprises, for example, physically including the annotator into the electronic document. The association between a certain electronic document and the annotation related to the respective context information may be stored in a document repository. The selection of the annotator may be performed by querying the document repository. In one example, the resulting electronic document comprising the annotator may be provided, e.g., in order to enable document search or document access by other users. In another example, steps 207-209 may further be performed.

In step 207, the electronic document may be processed using the selected annotator. For example, the processing of the electronic document may result in text passages of the electronic document being annotated (e.g., marked with colors). This may enable to extend the content of the electronic document in accordance with the present disclosure.

In step 209, at least part of the processed electronic document may be provided. In some examples, only the annotated text may be provided or the annotations indicated by the selected annotator of the electronic document. This may save processing resources such as the network bandwidth and may speed up document searches by providing focused results. In another example, the whole annotated document may be provided. Steps 207-209 may be optional steps. In some embodiments, providing may include transmitting the processed electronic document (or a portion thereof, such as just the annotations) from a first computer system (e.g., the document manager 401 in FIG. 4) to a second, different computer system (e.g., a computer system being utilized by a user 415). In some embodiments, providing may include displaying the processed electronic document (or a portion thereof) to the user.

Figure 4:
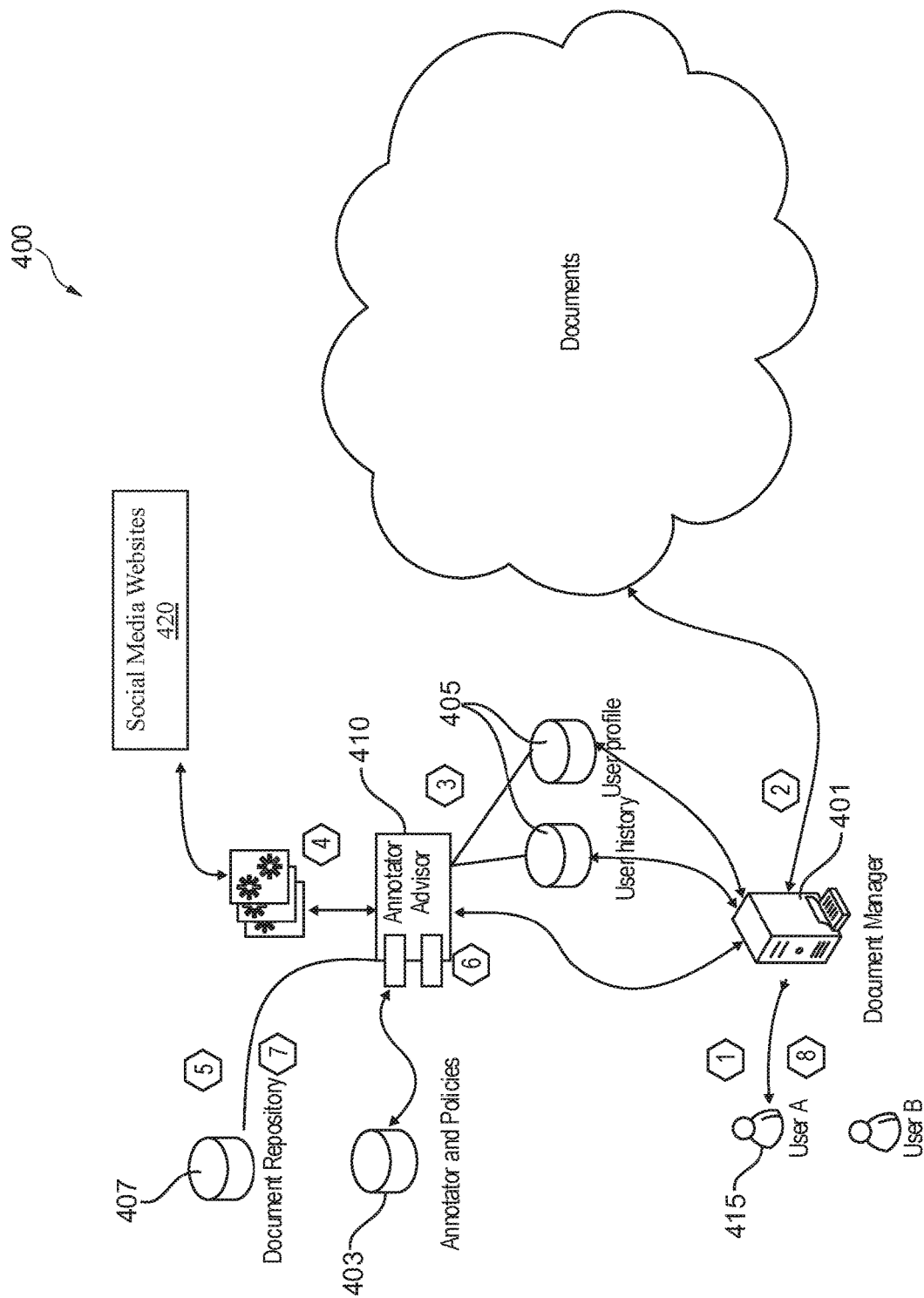
FIG. 4 depicts a diagram of a document processing system for a dynamic document extension through the annotators based on user context and user profile, in accordance with embodiments of the present disclosure.

Referring now to FIG. 4, shown is a diagram of a document processing system 400 for a dynamic document extension through the annotators based on user context and user profile, in accordance with embodiments of the present disclosure. The document processing system 400 comprises a document manager 401 which is used to perform a search and retrieve electronic documents. The electronic documents may, for example, be available documents in the cloud as illustrated in FIG. 4. The document processing system 400 further comprises a repository 403 that contains a set of annotators. The annotators of the repository 403 may, for example, be associated with their related policies or rules that are used by the annotators to perform annotations.

The document processing system 400 further comprises one or more user repositories 405 comprising information about the user history and/or the user profile. The user-profile refers to a collection of information about the user. The user profile may, for example, include information pertaining to the user's requirements. For example, the user-profile may include a document requirement corresponding to the user's requirements in term of document usage. The user profile may, for example, further indicate documents used or accessed by the user.

The document processing system 400 comprises an annotator advisor 410, such as system 100. The annotator 410 may be configured to monitor social media websites 420 as illustrated in FIG. 4. The monitoring may, for example, be performed using a set of predefined providers to determine social media trends.

The annotator advisor 410 may be configured to identify the proper annotator(s) to be applied to a given document based on a set of policies like, for example, social media trends (social networks, communities, blogs, etc.), user information (location, assets, etc.), and top relevant keywords used for the search.

The annotator advisor 410 may be configured to apply the identified annotator(s) on the given document resulting in an extended document. The annotator advisor 410 may be configured to propose the extended document to the user and store information on the extended document locally in a document repository 407 in order to use it for further uses (e.g., in response to further queries/requests).

An example embodiment of a disclosed method will now be described with reference to FIG. 4. It is to be understood that some embodiments of the document processing system 400 may be configured to perform all, some, or none of the following steps, and that the document processing system 400 may be configured to perform other methods instead of, or in addition to, the following example method. The document processing system 400 may be configured to perform an example method as follows.

In step 1 (as indicated with the hexagon), a user 415 looks for downloading a certain document (a current document) for the user's current needs. The user may, for example, be one of different users looking for a document but for different needs (e.g., a doctor versus a patient, recruiter versus job seeker, investor versus trader, etc.). In step 2, the document is found, and it is downloaded. In step 3, usage and user context of the user 415 is identified by the annotator advisor 410. For performing step 3, the annotator advisor 410 may, for example, retrieve from the user repository 405 the list of documents downloaded by the user 415 and optionally by peers of the user 415. For each document of the list, the annotator advisor 410 may retrieve the usage scope for the reader 415 such as business, vacation, leisure, cure some disease, etc. The annotator advisor 410 may determine the classification of the current document using medicine, literature, sports, etc. classes. The annotator advisor 410 may determine the context and profile of the user 415 using a NLP algorithm for analyzing the text of the currents chats, social media posts, and any documents or applications opened by the user 415.

In step 4, the annotator advisor 410 calculates or selects the annotators to be added into the metadata of the current document based on a function (classification, usage scope, user context, user profile) to maximize the level of potential interest 310 of the user 415 for the specific text annotated by each annotator as indicated in tables of FIG. 3. For example, the level of matching of the classification, usage scope, user context, user profile with the information associated with the annotators may indicate the level of interest of the user to an annotator. The current document may have more than one annotator of the table 305 with a high level of potential interest. For example, each annotator associated with a level of potential interest higher than the threshold may be selected.

In step 5, annotator advisor 410 looks in (e.g., queries) the document repository 407 to determine if there is already a document extended with the selected annotators. If so, step 8 of providing the existing extended document may be performed. Otherwise, steps 6-8 may be performed. The annotators may automatically be included into the current document in step 6.

The current document as built with the selected annotators is saved in step 7 in the document repository 407 so that it can be reused if similar users look for the same document in the same context. In step 8, the user 415 can identify and extract the text pointed by the annotators in the current built document.

The user value of this extended scenario is that a document can be mined with the best text extraction depending on the user and not only on the document itself, by using the current context and the current user profile. This may have several benefits including, for example, performance and classification benefits. For the performance benefit, the document may contain only the relevant annotators for the user and its context. This may save resources and time during its processing. For the classification benefit, the document may be tailored in terms of annotators to the specific user needs, and this may avoid sharing and retrieving other documents that will not be relevant to the user context.

Referring now to FIG. 5A and FIG. 5B, shown is a text portion of an electronic document, wherein different texts 501A-N are annotated (e.g., using different colors), and an example annotator-rule 510 defining a relationship between a disease and one or more symptoms, respectively, in accordance with embodiments of the present disclosure. The metadata may be stored into the PDF as uncompressed xml. The annotations may, for example, result from a cognitive analysis of the electronic document by a user or a cognitive system. For example, the user that created the annotations 501A-N may define for each annotation the tokens (e.g., words annotated) and assign them a named identifier. In other embodiments, the annotations 501A-N may be automatically generated by a computer system using, for example, natural language processing.

For example, a rule or analysis rule or annotator rule may be generated based on the annotations 501A-N. The annotations 501A-N indicate (as shown in FIG. 5B) that there is a relationship named "defined as" (501B) between the Disease annotated by tokens "Low Back Pain" (501A) and the sequence of one or more annotations named as Symptoms 501C (e.g., pain, muscle tension, etc.). Thus, an annotator-rule is defined in this example as a relationship between a Disease and one or more symptoms as illustrated in FIG. 5B.

Using the annotator rule 510 of FIG. 5B, an annotator may be created. For example, a metadata indicative of the rule may be stored into the PDF as uncompressed xml. Each of the elements used in the metadata may be explained in the PDF/A standard.

Referring now to FIG. 5C, shown is an example snippet of XML 520 of the PDF/A introducing the annotations and the rule. The xml of FIG. 5C is shown for exemplification in a format that is different from UIMA format.

Figure 6:
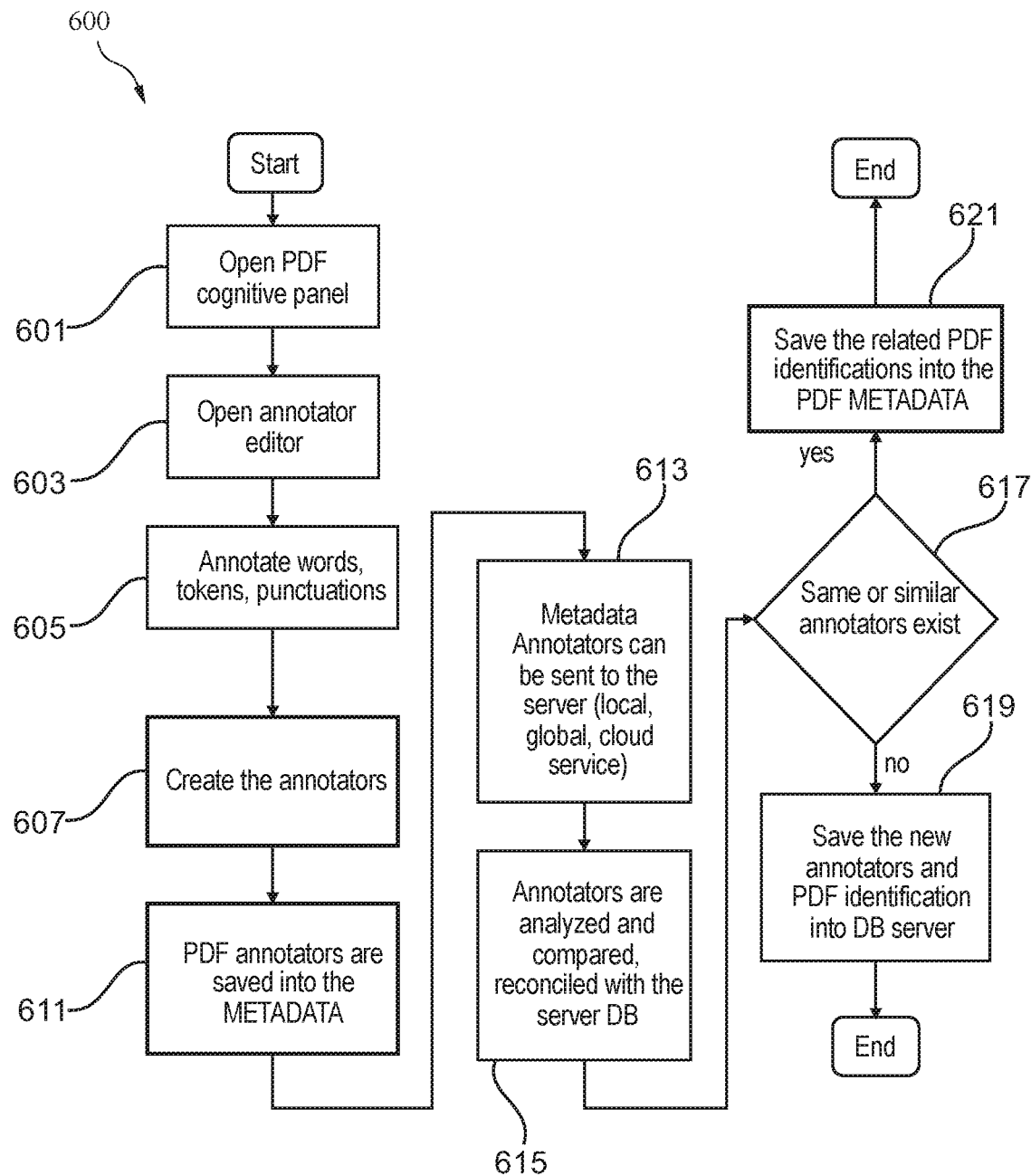
FIG. 6 is a flowchart of a method for providing annotators for a PDF document, in accordance with embodiments of the present disclosure.

Referring now to FIG. 6, shown is a flowchart of a method 600 for providing annotators for a PDF document, in accordance with embodiments of the present disclosure. FIG. 6 describes the part of an editor to annotate the PDF document and save the annotators into the PDF metadata. This metadata is sent to a cognitive server or to a "cognitive cloud service" that compares it with the annotators of other PDFs and with the annotators of other users of the same PDF document as follows.

In step 601, a PDF cognitive panel may be opened (e.g., by a user). In step 603, an annotator editor may be opened. In step 605, texts of the PDF document may be annotated. The texts may, for example, comprise words, tokens, and/or punctuations. In step 607, one or more annotators may be created using the annotations. The annotators may be saved in step 611 in metadata. The metadata may further comprise PDF identifications of the PDF document. In step 613, the metadata may be sent to a server database or cognitive server. The server database can be a local server repository or a global server database. A local server database can be used (e.g., to build relationships with other documents) by a single organization or company. A global server database can be a trusted and global repository for different users and for all PDF documents of the world or part of it.

In step 615, the annotators of the metadata may be compared with exiting annotators of the server database. If (inquiry step 617) same or similar annotators exist in the server database, the PDF identifications of the PDF document may be saved in step 621 (e.g., at the server database in association with the similar annotators). Otherwise, the annotators and the PDF identifications may be stored (e.g., in the server database) in step 619.

Figure 7:
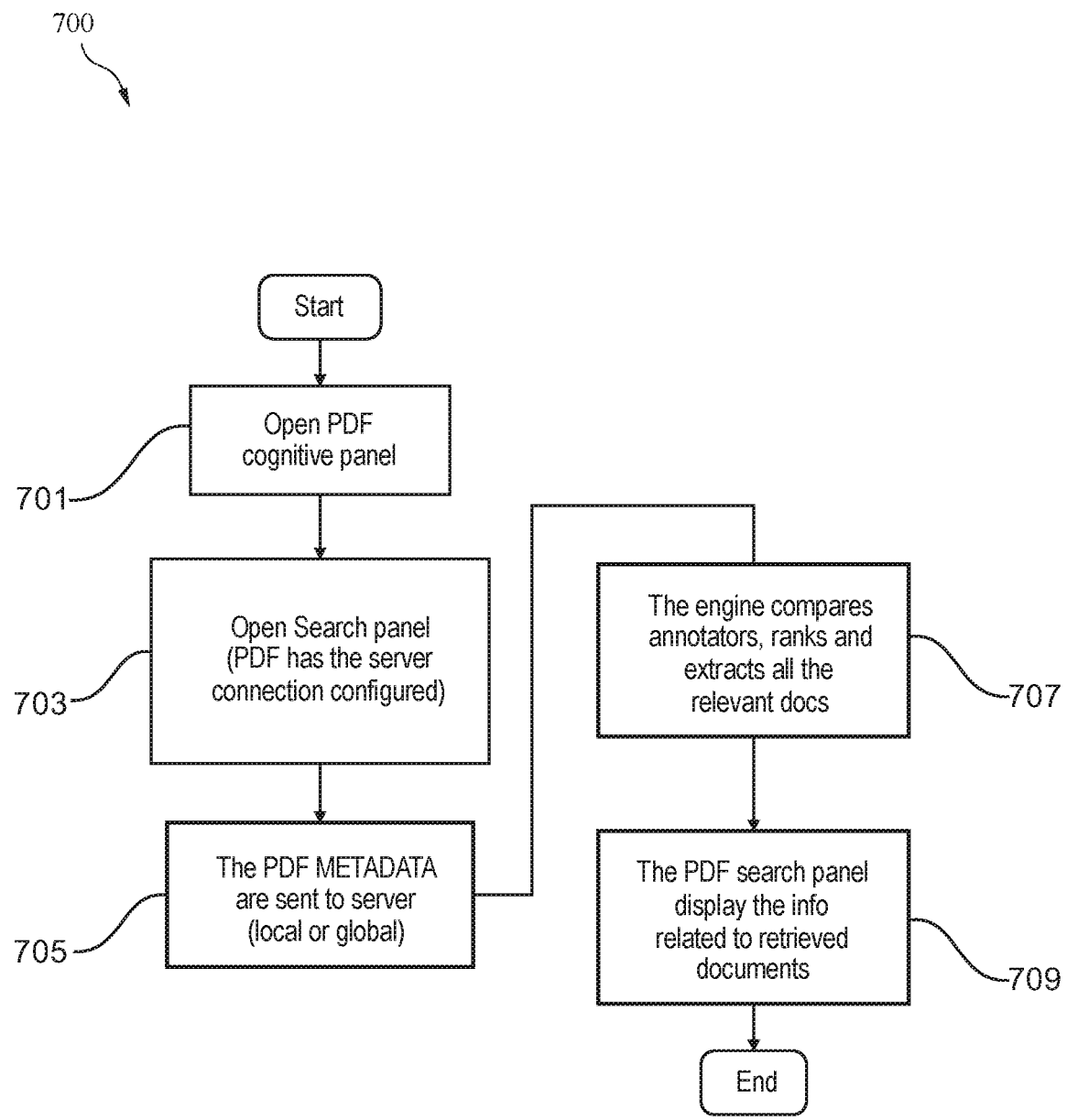
FIG. 7 is a flowchart of a method for searching PDF documents, in accordance with embodiments of the present disclosure.

Referring now to FIG. 7, shown is a flowchart of a method 700 for searching PDF documents (e.g., of the server database of FIG. 6), in accordance with embodiments of the present disclosure. FIG. 7 describes the search of documents related to a specific PDF document. For that, the annotators of the specific PDF document are analyzed and compared (e.g., by the server database) with all available annotators of PDF documents (e.g., of the server database). All the documents related to the specific PDF document are identified, for example, based on relationships and topics defined in the annotators of the specific PDF document.

In step 701, a cognitive panel of the specific PDF document is opened (e.g., by a user). In step 703, a search panel is opened. For example, the specific PDF document may have a server connection to the server database configured. In step 705, the metadata of the specific PDF document may be sent to the server database. The metadata as described in FIG. 6 may comprise annotators of the specific PDF document. In step 707, the metadata may be compared with stored documents in the server database. The comparison may be performed between annotators of the server database and of the metadata. This may result in identifying matched annotators (and corresponding matched PDF documents) of the server database that match at least part of the annotators of the metadata. The matched documents may be identified by, for example, counting how many annotators-rules of the given document of the metadata are matched to the annotators definition of other documents of the server database.

In one example, when documents and the annotators metadata are available in the server database, the comparison of step 707 may be performed by using the text of the documents and matching synonyms, instead of the original annotators, of the documents with the annotators of the metadata to be able to find out a match of the annotators on the text. This matching method may, for example, be assigned a different score factor compared to the comparison involving annotators only.

The identification of the matching documents may be performed based on a partial or full match between each of the compared annotators of the identified documents and the annotator of the metadata. A partial match between two compared annotators may, for example, be in the case of at least a predefined portion (e.g., 60%) of one annotator matches the other annotator. A score may be assigned to the matched documents. The score may depend on whether the match was full or partial match. In case of partial matching, a less quality may be indicated for the related matched documents.

In step 709, the identified PDF documents may be retrieved and displayed on a PDF search panel of the specific PDF document.

In another example, a method for processing an electronic document is provided. The method comprises: retrieving the electronic document during a computing session maintained for a user of a computer system; determining context information related to the computing session; selecting an annotator from a set of annotators based on the context information, the annotator comprising data describing a set of rules for automated annotating content of the electronic document; and associating the selected annotator with the electronic document, wherein said associating is specific to the user. For example, associating the selected annotator comprises physically including the annotator into the electronic document. For example, the method comprises storing the association between a certain electronic document and the annotation related to the respective context information in a document repository and wherein selecting the annotator comprises querying the document repository.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

In one aspect, the invention relates to a computer implemented method for processing an electronic document. The method comprises:
a. retrieving as the electronic document a first electronic document during a computing session maintained for a user of a computer system;
b. determining context information related to the computing session;
c. selecting at least one annotator from a set of annotators based on the context information, the annotator comprising data describing a set of rules for annotating content of the electronic document;
d. associating the selected annotator with the electronic document, wherein said associating is specific to the user.

In another aspect, the invention relates to a computer program product comprising a computer-readable storage medium having computer-readable program code embodied therewith, the computer-readable program code configured to implement all of steps of the method according to preceding embodiments.

In another aspect, the invention relates to a computer system for processing an electronic document. The computer system is configured for:
a. retrieving the electronic document during a computing session maintained for a user of a computer system;
b. determining context information related to the computing session;
c. selecting at least one annotator from a set of annotators based on the context information, the annotator comprising data describing a set of rules for annotating content of the electronic document;
d. associating the selected annotator with the electronic document, wherein said associating is specific to the user.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 8:
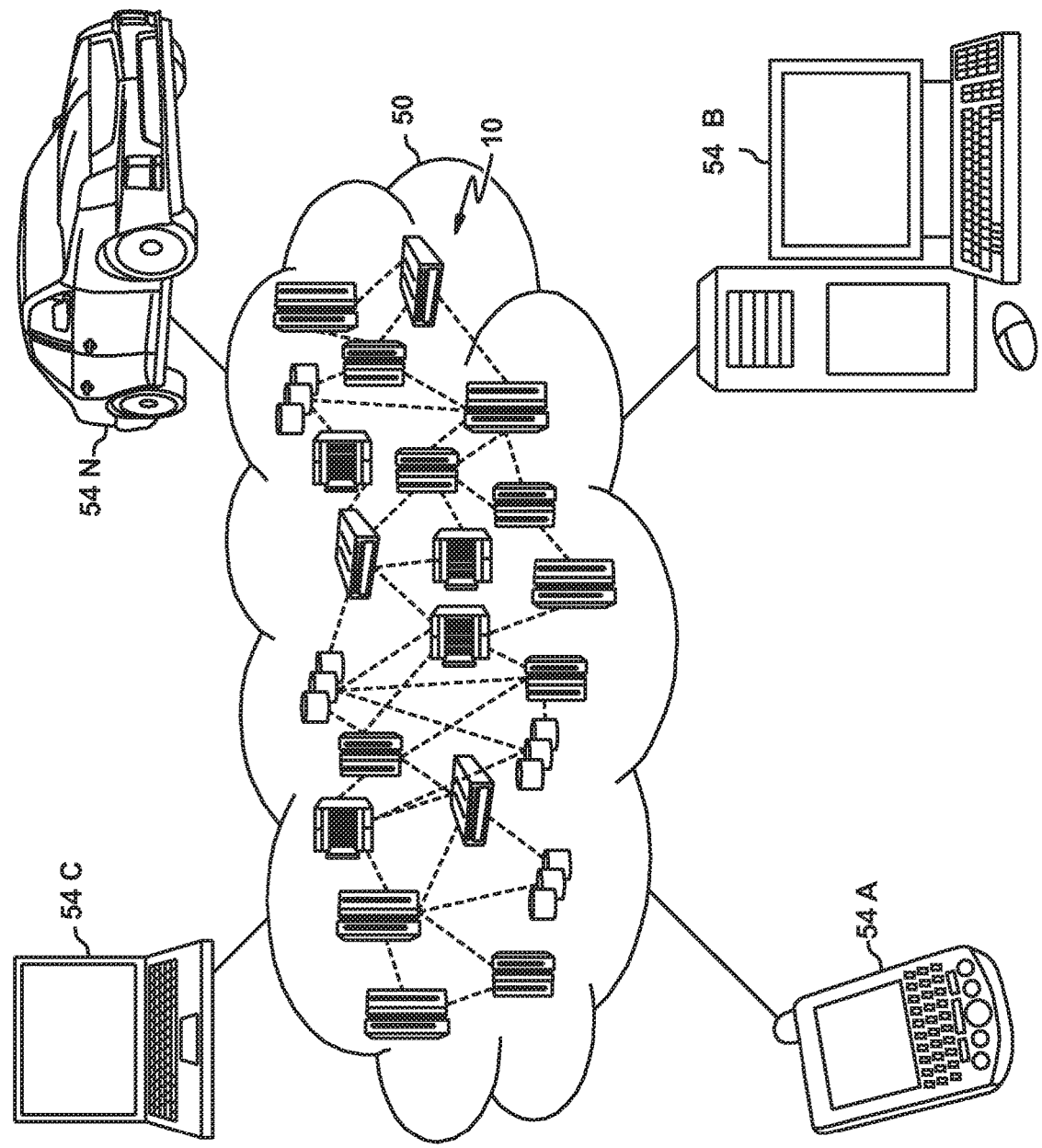
FIG. 8 depicts a cloud computing environment according to an embodiment of the present invention.

Referring now to FIG. 8, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Figure 9:
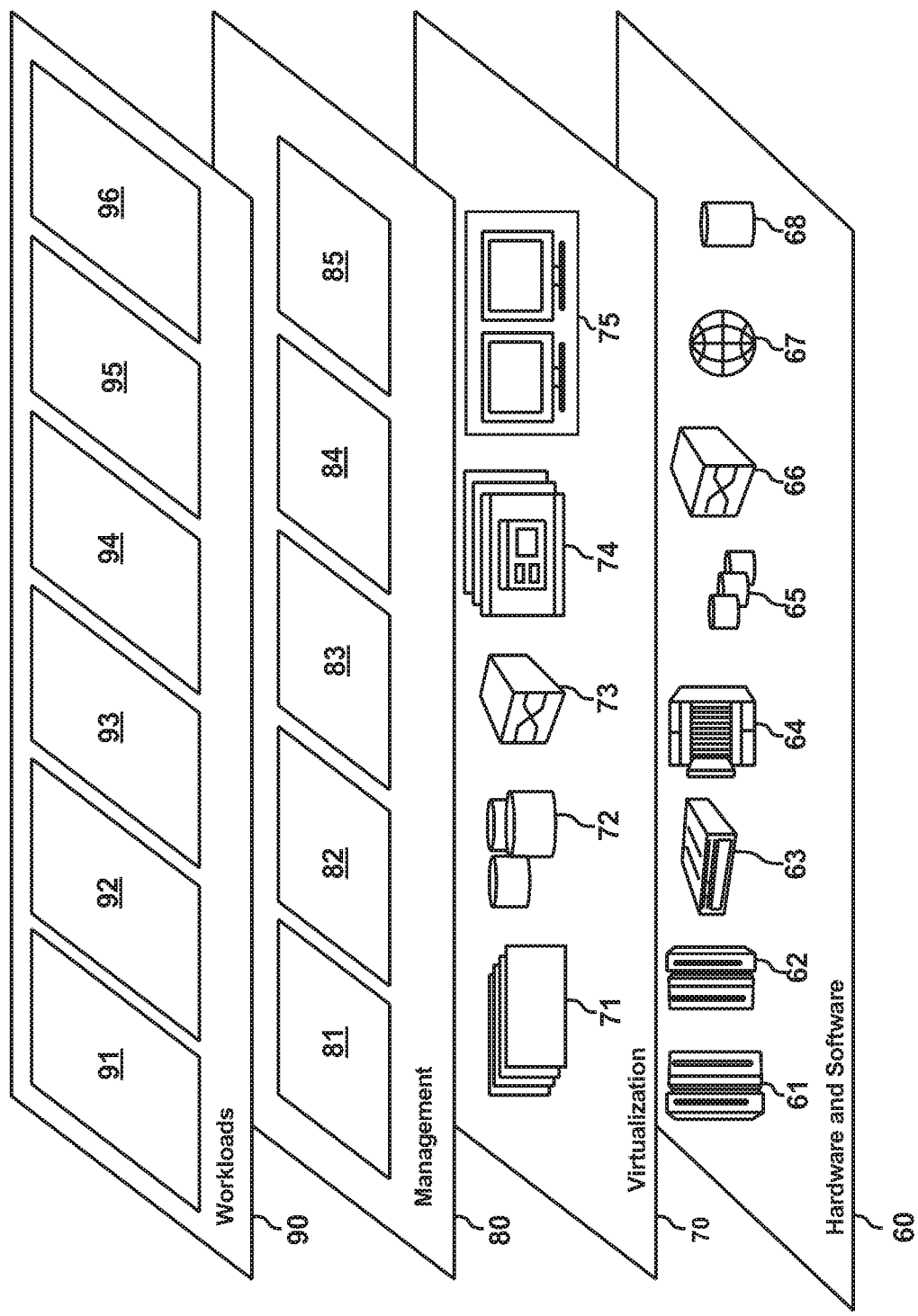
FIG. 9 depicts abstraction model layers according to an embodiment of the present invention.

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and mobile desktops 96.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding of the various embodiments. But, the various embodiments may be practiced without these specific details. In other instances, well-known circuits, structures, and techniques have not been shown in detail in order not to obscure embodiments.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure may not be necessary. The previous detailed description is, therefore, not to be taken in a limiting sense.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present invention has been described in terms of specific embodiments, it is anticipated that alterations and modification thereof will become apparent to those skilled in the art. Therefore, it is intended that the following claims be interpreted as covering all such alterations and modifications as fall within the true spirit and scope of the invention.

What is claimed is:

1. A computer implemented method for processing an electronic document, the method comprising:
   retrieving an electronic document during a computing session maintained for a user of a computer system;

determining context information related to the computing session, wherein the context information comprises user attributes indicating a current action of the user and a current state of the user, and wherein the context information is obtained, in part, by analyzing, using natural language processing, text of electronic documents and applications currently opened by the user during the computing session;

generating, based on the context information, an interest score for each annotator of a set of annotators that correlates to the determined context information;

comparing the interest score for each annotator of the set of annotators to a predetermined interest threshold;

selecting, in response to the predetermined interest threshold being met for at least one annotator, the at least one annotator from the set of annotators, the at least one annotator comprising data describing a set of rules for annotating content of the electronic document; and associating the selected annotator with the electronic document, wherein said associating is specific to the user.

2. The method of claim 1, wherein associating the selected annotator comprises physically including the annotator into the electronic document.

3. The method of claim 1, the method further comprising:
storing associations between a plurality of electronic documents and respective annotations for each of the plurality of electronic documents in a document repository, wherein the respective annotations are related to the respective context information, and wherein selecting the at least one annotator comprises querying the document repository.

4. The method of claim 1, the method further comprising:
processing the electronic document using the selected annotator; and
providing at least part of the processed electronic document.

5. The method of claim 4, wherein providing the processed electronic document further comprises providing annotated content of the processed electronic document.

6. The method of claim 4, the method further comprising:
retrieving a second electronic document during the computing session;
generating, based on the context information and the second electronic document, a second interest score for each annotator of a second set of annotators;
comparing the second interest score for each annotator of the second set of annotators to the predetermined interest threshold; and
selecting, in response to the predetermined interest threshold being met by at least one annotator of the second set of annotators, a second annotator from the second set of annotators, the second annotator comprising data describing a second set of rules for annotating content of the second electronic document.

7. The method of claim 6, the method further comprising:
processing, in response to a portion of the selected second annotator for the second electronic document being different from the one or more annotators selected for the electronic document, the second electronic document using the selected second annotator; and
providing at least part of the processed second electronic document, wherein the processed second electronic document further comprises annotated content.

8. The method of claim 6, the method further comprising:
providing, in response to retrieving the second electronic document and the selected second annotator being the same as the one or more annotators selected for the electronic document, the at least part of the processed electronic document.

9. The method of claim 4, further comprising:
receiving a request for the electronic document from another user,
determining the context information of the another user, wherein the context information of the another user comprises at least part of the determined context information of a first user; and
providing the processed electronic document as a response to the request.

10. The method of claim 9, wherein the context information of the another user does not comprise at least part of the determined context information, the method further comprising:
determining context information related to the computing session of the another user;
generating, based on the context information related to the computing session of the another user, a third interest score for each annotator of a third set of annotators that correlates to the determined context information of the another user;
comparing the third interest score for each annotator of the third set of annotators to the predetermined interest threshold;
selecting, in response to the predetermined interest threshold being met for at least one annotator of the third set of annotators, a third annotator from the third set of annotators, the third annotator comprising data describing a third set of rules for annotating content of the electronic document;
associating the selected third annotator with the electronic document, wherein said associating is specific to the another user;
processing the electronic document using the third annotator; and
providing at least part of the electronic document processed using the third annotator.

11. The method of claim 1, the method further comprising:
storing the selected one or more annotators in association with an identifier of the electronic document in a predefined database;
receiving a request for the electronic document;
searching, in response to receiving the request, the database to identify similar annotators to the one or more annotators of the requested electronic document; and
returning the identifiers of one or more documents from the database that are associated with the similar annotators.

12. The method of claim 1, wherein the current state of the user is obtained from a user communication.

13. The method of claim 1, wherein the current state of the user is stressed.

14. The method of claim 1, wherein the current action of the user is performing a task using the computer system.

15. A computer program product comprising a computer readable storage medium having program instructions embodied therewith, the program instructions executable by a processor to cause the processor to perform a method comprising:
retrieving an electronic document during a computing session maintained for a user of a computer system;
determining context information related to the computing session, wherein the context information comprises user attributes indicating a current action of the user and a current state of the user, and wherein the context information is obtained, in part, by analyzing, using natural language processing, text of electronic documents and applications currently open during the computing session;

generating, based on the context information, an interest score for each annotator of a set of annotators that correlates to the determined context information;

comparing the interest score for each annotator of the set of annotators to a predetermined interest threshold;

selecting, in response to the predetermined interest threshold being met for at least one annotator, the at least one annotator from the set of annotators based on the context information, the at least one annotator comprising data describing a set of rules for annotating content of the electronic document;

associating the selected annotator with the electronic document, wherein said associating is specific to the user;

processing the electronic document using the selected annotator; and providing at least part of the processed electronic document.

16. The computer program product of claim 15, wherein the method performed by the processor further comprises:

retrieving a second electronic document during the computing session;

generating, based on the context information and the second electronic document, a second interest score for each annotator of a second set of annotators;

comparing the second interest score for each annotator of the second set of annotators to the predetermined interest threshold;

selecting, in response to the predetermined interest threshold being met for at least one annotator of the second set of annotators, a second annotator from the second set of annotators, the second annotator comprising data describing a second set of rules for annotating content of the second electronic document;

processing, in response to a portion of the selected second annotator for the second electronic document being different from the one or more annotators selected for the electronic document, the second electronic document using the selected second annotator; and providing at least part of the processed second electronic document, wherein the processed second electronic document further comprises annotated content.

17. The computer program product of claim 15, wherein the method performed by the processor further comprises:

receiving a request for the electronic document from another user, determining the context information of the another user, wherein the context information of the another user comprises at least part of the determined context information of a first user; and providing the processed electronic document as a response to the request.

18. A computer system for processing an electronic document, wherein the computer system includes a processor configured to perform a method, the method comprising:

retrieving an electronic document during a computing session maintained for a user of a computer system;

determining context information related to the computing session, wherein the context information comprises user attributes indicating a current action of the user and a current state of the user, and wherein the context information is obtained, in part, by analyzing, using natural language processing, text of electronic documents and applications currently opened by the user during the computing session;

generating, based on the context information, an interest score for each annotator of a set of annotators that correlates to the determined context information;

comparing the interest score for each annotator of the set of annotators to a predetermined interest threshold;

selecting, in response to the predetermined interest threshold being met for at least one annotator, the at least one annotator from the set of annotators, the at least one annotator comprising data describing a set of rules for annotating content of the electronic document;

associating the selected annotator with the electronic document, wherein said associating is specific to the user;

processing the electronic document using the selected annotator; and providing at least part of the processed electronic document.

19. The computer system of claim 18, wherein the method performed by the processor further comprises:

receiving a request for the electronic document from another user, determining the context information of the another user, wherein the context information of the another user comprises at least part of the determined context information of a first user; and providing the processed electronic document as a response to the request.

20. The computer system of claim 18, wherein the method performed by the processor further comprises:

storing the selected one or more annotators in association with an identifier of the electronic document in a predefined database;

receiving a request for the electronic document;

searching, in response to receiving the request, the database to identify similar annotators to the one or more annotators of the requested electronic document; and returning the identifiers of one or more documents from the database that are associated with the similar annotators.

* * * * *